United States Patent
Soeno et al.

(10) Patent No.: US 6,381,104 B1
(45) Date of Patent: Apr. 30, 2002

(54) WRITE/READ HEAD SUPPORTING MECHANISM, AND WRITE/READ SYSTEM

(75) Inventors: Yoshikazu Soeno; Shinji Ichikawa; Masashi Shiraishi; Takeshi Wada; Takamitsu Tsuna; Norikazu Ota; Takashi Honda; Mitsuyoshi Kawai, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/439,092

(22) Filed: Nov. 12, 1999

(30) Foreign Application Priority Data

Nov. 13, 1998 (JP) .............................. 10-341130
Jul. 14, 1999 (JP) .............................. 11-200357
Oct. 20, 1999 (JP) .............................. 11-298336

(51) Int. Cl.⁷ .............................................. G11B 5/596
(52) U.S. Cl. .............................. 360/294.4; 360/234.5; 360/234.6; 360/294.3
(58) Field of Search .................... 360/294.6, 294.5, 360/294.4, 234.5, 234.6, 294.3; 369/300

(56) References Cited

U.S. PATENT DOCUMENTS 5,856,896 A    1/1999  Berg et al. .................. 360/104
5,898,541 A    4/1999  Boutaghou et al. .......... 360/109
5,982,585 A  * 11/1999  Fan et al. .................... 360/104
6,078,473 A  *  6/2000  Crane et al. ................. 360/104

FOREIGN PATENT DOCUMENTS

| JP | 6-259905 | 9/1994 |
| JP | 6-309822 | 11/1994 |
| JP | 8-180623 | 7/1996 |
| JP | 10-11923 | 1/1998 |
| JP | 10-136665 | 5/1998 |
| WO | WO 98/19304 | 5/1998 |
| WO | WO 98/25264 | 6/1998 |

* cited by examiner

Primary Examiner—Robert S. Tupper
(74) Attorney, Agent, or Firm—Oblon, Spivak, McClelland, Maier & Neustadt, P.C.

(57) ABSTRACT

The object of the invention is to provide a write/read head supporting mechanism for a magnetic or optical disk system having a micro-displacement actuator, by which any impediment to the displacement capability of the actuator is eliminated to achieve reliability improvements. The write/read head supporting mechanism comprises a slider, a suspension and an actuator as at least head constituents. The slider is provided with an electromagnetic transducer element or an optical module. The slider supported on the suspension by way of the actuator is displaceable relatively with respect to the suspension by the actuator. Between relatively displacing head constituents there is a space. Preferably, friction-reducing means should be provided in the space.

23 Claims, 9 Drawing Sheets

WRITE/READ HEAD SUPPORTING MECHANISM, AND WRITE/READ SYSTEM

BACKGROUND OF THE INVENTION

The present invention relates to a write/read head supporting mechanism for write/read systems such as disk drives (hereinafter HDDs for short) or optical disk drives, and a write/read system comprising read head supporting mechanism.

A prior art magnetic head supporting mechanism used with HDDs is generally built up of a slider having an electromagnetic transducer element, a suspension for supporting the slider, and an interconnecting pattern formed on the surface of a suspension, which pattern is connected to the electromagnetic transducer element.

The electromagnetic transducer element comprises a magnetic pole and coil for converting electric signals to magnetic signals, and vice versa, a magnetoresistance effect element for transforming magnetic signals to voltage signals, and so on, each being fabricated by thin-film techniques, assembly techniques, etc. The slider is formed of non-magnetic ceramics such as $Al_2O_3$—TiC or $CaTiO_3$ or a magnetic material such as ferrite, and has a generally cuboidal shape. The surface (air bearing surface) of the slider opposite to a disk medium is processed into a shape suitable for generating pressure to fly the slider on the disk medium at a small spacing. The suspension for supporting the magnetic head is formed by bending, punching or otherwise processing a resilient stainless sheet. The interconnecting pattern has a general structure wherein conductor wires are covered with a resin. Electrical connections using the interconnecting pattern formed on the surface of the suspension are smaller in capacitive components and inductive components than those using lead wires, and so are suitable for high-frequency signal recording.

On the other hand, a HDD is increasingly required to be downsized with ever-higher recording density and, hence, have ever-higher track density and ever-narrower track width. To improve tracking precision in a high-density recording HDD, it is effective to provide the magnetic head with an actuator for effecting a micro-displacement of the electromagnetic transducer element or slider with respect to the suspension. Such an actuator, for instance, is disclosed in JP-A's 6-259905, 6-309822 and 8-180623.

As the slider is driven by such an actuator as mentioned above, the slider displaces relatively with respect to the suspension. When, at this time, adjacent head constituents come in contact with each other, i.e., the actuator and suspension, the actuator and slider, and the slider and suspension come in contact with each other, the displacement capability of the actuator is impaired by friction, leading to a possibility that the alignment accuracy of an electromagnetic transducer element may decrease. Further, there is a possibility that the reliability of each head constituent may decrease due to friction loads and collision impacts. Furthermore, there is a possibility that the reliability of write/read capability may drop by reason of fear, collisions, dusting, etc. However, the above publications disclosing the provision of the actuator pay no attention to such problems likely to arise between head constituents.

An object of the present invention is to provide a write/read head supporting mechanism for a magnetic or optical disk system having a micro-displacement actuator, by which any impediment to the displacement capability of the actuator is eliminated to achieve reliability improvements.

SUMMARY OF THE INVENTION

Such an object is achievable by the constructions of the invention defined below as (1) to (23).

(1) A write/read head supporting mechanism comprising a slider, a suspension and an actuator as at least head constituents, said slider being provided with an electromagnetic transducer element or an optical module, said slider being supported on said suspension by way of said actuator, and said slider being displaceable relatively with respect to said suspension by said actuator, wherein;

space-forming means are provided to form a space between relatively displacing head constituents.

(2) The write/read head supporting mechanism according to (1) above, wherein at least one of an electrode, an interconnecting pattern and a bonding member provided between said relatively displacing head constituents is used as said space-forming means.

(3) The write/read head supporting mechanism according to (2) above, wherein said bonding member has electrical conductivity.

(4) The write/read head supporting mechanism according to any one of (1) to (3) above, wherein a step provided on at least one of said relatively displacing head constituents is used as said space-forming means.

(5) The write/read head supporting mechanism according to any one of (1) to (4) above, wherein said space has a size of 5 to 50 µm.

(6) The write/read head supporting mechanism according to any one of (1) to (5) above, wherein said space-forming means are located symmetrically with respect to a center axis of each of said suspension, actuator and slider, which center axis is substantially parallel with a direction of extension of said suspension.

(7) The write/read head supporting mechanism according to any one of (1) to (6) above, wherein at least one of said space-forming means is made up of three or more constituent units, with at least three units of said three or more constituent units being not linearly arranged.

(8) The write/read head supporting mechanism according to any one of (1) to (7) above, wherein a surface of said actuator and a surface of said suspension which are opposite to each other with said space located therebetween are substantially parallel with each other and/or a surface of said actuator and a surface of said slider which are opposite to each other with said space located therebetween are substantially parallel with each other.

(9) The write/read head supporting mechanism according to any one of (1) to (8) above, wherein a lubricant is present as a friction-reducing means in at least one of said spaces, said lubricant containing a solid particle having a particle diameter substantially equal to a length of said spaces.

(10) The write/read head supporting mechanism according to (9) above, wherein said lubricant has said solid particle dispersed in a semi-solid and/or a liquid.

(11) The write/read head supporting mechanism according to (9) or (10) above, wherein said lubricant has electrical conductivity.

(12) The write/read head supporting mechanism according to any one of (1) to (8) above, wherein at least one film composed mainly of an organic material or an inorganic material is present as said friction-reducing means in at least one of said spaces, said film having a thickness substantially equal to a length of said space, and being fixed to only one of two head constituents with said space located therebetween or unfixed to any of said two head constituents.

(13) The write/read head supporting mechanism according to (12) above, wherein said film has electrical conductivity.

(14) The write/read head supporting mechanism according to any one of (1) to (8) above, wherein at least one of said spaces has as said friction-reducing means and/or said space forming means at least one protuberance extending from at least one of two head constituents with said space located therebetween, said protuberance having a height substantially equal to a length of said space.

(15) The write/read head supporting mechanism according to (14) above, wherein said protuberance is provided with a curved surface in the vicinity of an end thereof.

(16) The write/read head supporting mechanism according to (14) or (15) above, wherein said protuberance comprises a protuberance body and a covering film for covering at least the vicinity of an end thereof, said covering film being formed of a material having a coefficient of friction lower than that of said protuberance body.

(17) The write/read head supporting mechanism according to any one of (14) to (16) above, wherein said protuberance is formed on said actuator.

(18) The write/read head supporting mechanism according to any one of (14) to (17) above, wherein said protuberance has electrical conductivity.

(19) The write/read head supporting mechanism according to any one of (1) to (18) above, wherein said actuator makes use of inverse piezoelectric effect or electroresistive effect.

(20) The write/read head supporting mechanism according to any one of (1) to (19) above, wherein an interconnecting wire to said actuator and/or an interconnecting wire to said slider are formed on said suspension.

(21) The write/read head supporting mechanism according to any one of (1) to (20) above, which includes a main actuator for driving said suspension.

(22) A write/read system which comprises a write/read head supporting mechanism as recited in any one of (1) to (21) above.

PREFERRED EMBODIMENTS OF THE INVENTION

The write/read head supporting mechanism according to the invention comprises a slider provided with an electromagnetic transducer element or an optical module, and a suspension on which the slider is mounted while an actuator for displacing the slider is located between them. The present invention will now be explained with reference to a magnetic head with an electromagnetic transducer element mounted on a slider.

First of all, typical constructions of the suspension, actuator and slider are explained.

Figure 13:
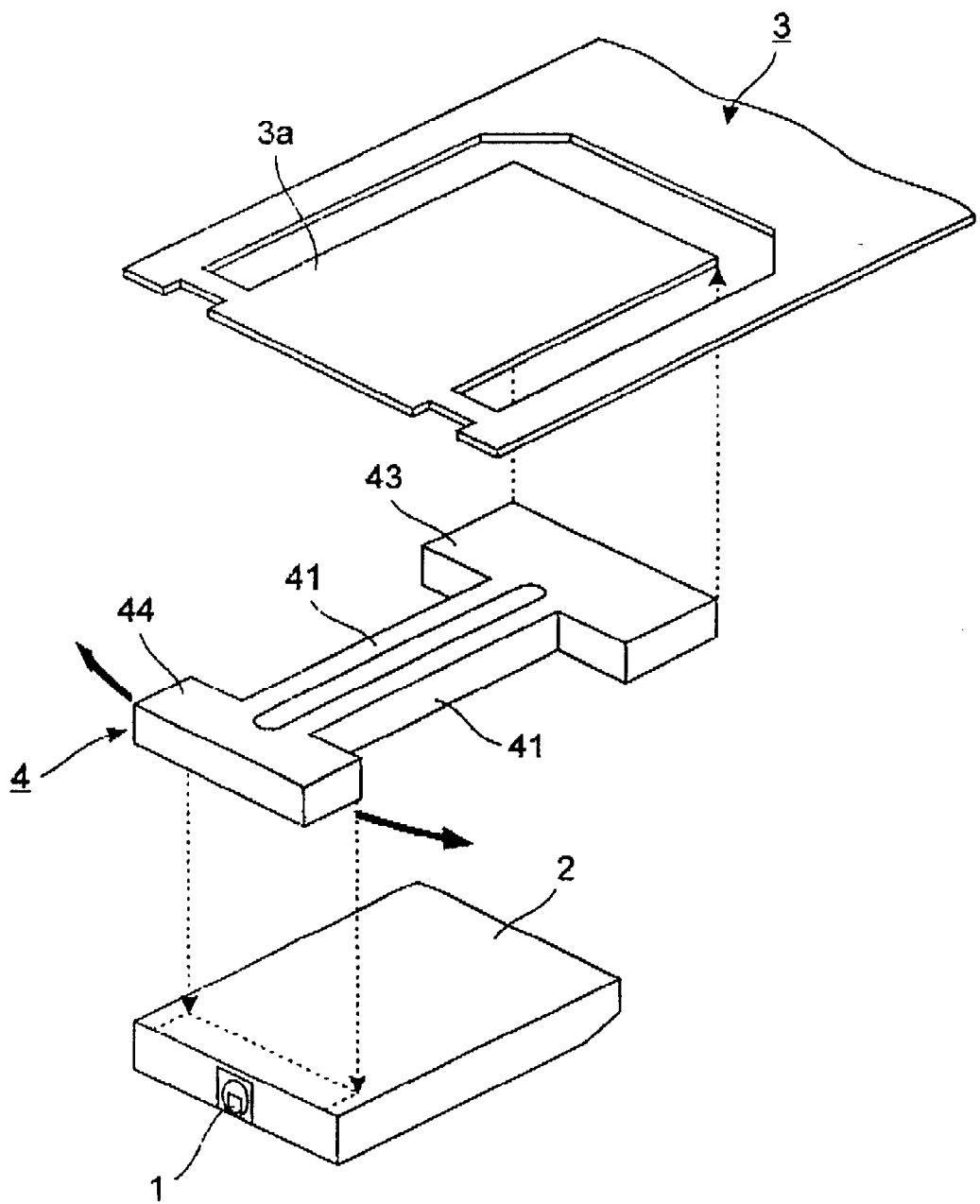
FIG. 13 is an exploded perspective view of one exemplary construction of a magnetic head supporting mechanism.

FIG. 13 is an exploded perspective view of one exemplary construction of the magnetic head supporting mechanism including an actuator. This magnetic head supporting mechanism is built up of a slider 2 provided with an electro-magnetic transducer element 1 and a suspension 3 for supporting the slider 2, with an actuator 4 located between the slider 2 and the suspension 3.

The actuator 4 is to effect a micro-displacement of the slider 2 with respect to the suspension 3, and is fixed as by bonding to a gimbal part 3a located at an end portion of the suspension 3. The gimbal part 3a is formed by providing grooves in the suspension member by etching, punching or the like for the purpose of allowing the slider to follow a disk medium surface. It is here noted that the magnetic head is provided with a main actuator for driving the whole of the suspension.

The actuator 4 comprises a fixed part 43 and a movable part 44, and further includes two rod-like displacement-generating means 41 and 41. Each or the displacement-generating means 41 is provided with at least one piezoelectric or electrostrictive material layer having electrode layers on both sides, and constructed such that it elongates and contracts upon the application of voltage on the electrode layers. The piezoelectric or electrostrictive material layer is formed of a piezoelectric or electrostrictive material that elongates and contracts by inverse piezoelectric effect or electrostrictive effect. One end of the displacement-generating means 41 is coupled to the suspension via the fixed part 43, and the other end of the displacement-generating means 41 is coupled to the slider via the movable part 44. Upon the elongation and contraction of the displacement-generating means 41, the slider is so displaced that the electromagnetic transducer element is displaced circularly. This in turn causes the electromagnetic transducer element to cross over recording tracks on a disk medium.

When the piezoelectric or electrostrictive material layer sandwiched between the electrode layers in the displacement-generating means 41 of the actuator 4 is constructed of a so-called piezoelectric material such as PZT, the piezoelectric or electrostrictive material layer is usually subjected to a polarizing treatment so as to improve its displacement capability. The direction of polarization by this polarization treatment is a thickness-wise direction of the actuator. When the direction of an electric field upon the application of voltage on the electrode layers is in alignment with the direction of polarization, the piezoelectric or electrostrictive material layer between both electrode layers elongates in its thickness-wise direction (piezoelectric longitudinal effect), and contracts in its plane direction (piezoelectric transverse effect). When the direction of the electric field is reverse to the direction of polarization, on the other hand, the piezoelectric or electrostrictive material layer contracts in its thickness-wise direction (piezoelectric longitudinal effect), and elongates in its plane direction (piezoelectric transverse effect). When contraction-inducing voltage is applied alternately on one displacement-generating means and another displacement-generating means, the length ratio between one displacement-generating means and another displacement-generating means changes so that both displacement-generating means deflect in the same direction in the plane of the actuator. By this deflection, the movable part 44 rolls and pitches with respect to the fixed part 43 in a direction indicated by arrows in FIG. 13, with the center of the roll-and-pitch motion defined by the position of the movable part 44 in the absence of voltage. This roll-and-pitch motion allows the movable part 44 to displace circularly in a direction substantially perpendicular to the direction of elongation and contraction of the displacement-generating means 41, with the direction of the roll-and-pitch motion lying within the plane of the actuator. Thus, the electromagnetic transducer element, too, rolls and pitches in a circular orbit. At this time, there is no fear of attenuation of polarization because the direction of voltage is in alignment with that of polarization. It is noted that even when both the displacement-generating means are elongated by voltage applied alternately thereon, similar roll-and-pitch motion occurs.

In the illustrated actuator embodiment, voltages may be simultaneously applied on both displacement-generating means in such a manner that their displacements are reverse to each other. In other words, alternating voltages may be simultaneously applied on both the displacement-generating means in such a manner that one elongates while another contracts, and vice versa. At this time, the center of the roll-and-pitch motion of the movable part 44 is defined by the position of the movable part 44 in the absence of voltage. Assuming here that the same driving voltage is used, the amplitude of the roll-and-pitch motion is about twice as large as that in the case of the alternate application of voltage. On one side of the roll-and-pitch motion in this case, however, the displacement-generating means is so elongated that the direction of the driving voltage is reverse to the direction of polarization. For this reason, the polarization of the piezoelectric or electrostrictive material layer may possibly attenuate at a high applied voltage or upon the continued application of voltage. It is thus required that the driving voltage be obtained by applying a constant direct current bias voltage in the same direction as that of polarization and superposing the aforesaid alternating voltage on the bias voltage, thereby foreclosing the possibility that the direction of driving voltage may be reverse to the direction of polarization. The center of the roll-and-pitch motion in this case is defined by the position of the displacement-generating means with the bias voltage alone applied thereon.

The actuator 4 has a structure in which the displacement-generating means 41, and fixed and movable parts 43 and 44 are formed as an integrated single piece by holing and notching a sheet-like member of piezoelectric or electrostrictive material with electrode layers formed at given sites. It is thus possible to increase the rigidity and dimensional accuracy of the actuator, with no fear of assembly errors. In addition, since any adhesive is not used for actuator fabrication, it is highly unlikely that any adhesive layer is deposited at the position of the actuator where stresses are induced by the deformation of the displacement-generating means. Stated otherwise, problems such as transmission losses due to the adhesive layer and changes-with-time of adhesion strength are absolutely unlikely to come up.

By the "piezoelectric or electrostrictive material" used herein is meant a material capable of elongating or contracting due to the inverse piezoelectric effect or electrostrictive effect. Any desired piezoelectric or electrostrictive material may be used provided that it can be applied to the displacement-generating means of the actuator. By reason of high rigidity, however, it is usually preferable to use ceramic piezoelectric or electrostrictive materials such as PZT [Pb(Zr, Ti)O$_3$], PT (PbTiO$_3$), PLZT [(Pb, La)(Zr, Ti)O$_3$], and barium titanate (BaTiO$_3$). The actuator, when it is made up of ceramic piezoelectric or electrostrictive materials, may easily be fabricated using thick-film techniques such as a sheet-making or printing process. It is noted that the actuator may also be fabricated by thin-film techniques. The piezoelectric or electrostrictive material, when it has a crystalline structure, may be of either a polycrystalline structure or a monocrystalline structure.

No special limitation is imposed on how to form the electrode layers; an appropriate selection may be made from various processes such as printing, firing, sputtering, and evaporation of conductive paste while how to form the piezoelectric or electrostrictive material layer is taken into account.

An actuator may have any structure in which at least one piezoelectric or electrostrictive material layer, having electrode layers on both sides, exists at the displacement-generating means. However, it is preferable to use a multi-layer structure wherein two or more such piezoelectric or electrostrictive material layers are stacked one upon another. The amount of elongation and contraction of the piezoelectric or electrostrictive material layer is proportional to electric field intensity. However, the aforesaid multi-layer structure makes it possible to make the piezoelectric or electrostrictive material layer so thin that the required electric field intensity can be obtained at a low voltage, and so the driving voltage can be lowered. At the same driving voltage as that used with a single layer structure, the amount of elongation and contraction can become much larger. The thickness of the piezoelectric or electrostrictive material layer is not critical, and so may be determined depending on various conditions such as driving voltage, the required amount of elongation and contraction, and ease of fabrication. However, a thickness of about 5 μm to about 50 μm is usually preferred in the practice of the invention. Similarly, the upper limit to the number of piezoelectric or electrostrictive material layers stacked one upon another is not critical, and so may be determined in such a manner that displacement-generating means having a desired thickness are obtainable. It is noted that a covering piezoelectric or electrostrictive material layer is usually provided on the outermost electrode layer.

Although not illustrated, the suspension 3 is provided on its surface with an interconnecting pattern for driving the actuator 4 and an interconnecting pattern to be connected to the electromagnetic transducer element 1 as occasion may be. The suspension 3 may also be provided on its surface with a head driving IC chip (a read/write IC). If a signal processing IC is mounted on the suspension, it is then possible to reduce the length of the interconnecting pattern from the electromagnetic transducer element to the signal processing IC, so that the signal frequency can be made high due to a decrease in inductive components.

While the present invention is suitable for cases where the actuator of the illustrated integral structure is used, it is understood that the present invention may also be used for cases where various actuators having assembly structures employing piezoelectric elements, and actuators making use of electrostatic force, and electromagnetic force are used.

The suspension 3 is generally formed of a resilient metal material such as stainless steel. On the other hand, the interconnecting pattern has a structure wherein conductor wires are covered with a resin. No special limitation is imposed on how to form the interconnecting pattern having such a structure; however, it is preferable to make use of a process wherein an insulating resin film is formed on the surface of the suspension 3 and a conductor wire is formed on the resin film followed by forming another resin film thereon as a protective film, and a process wherein an interconnecting film having a multi-layer structure comprising such a resin film and a conductor wire is bonded to the suspension 3.

In the magnetic head supporting mechanism having such construction as mentioned above, spaces are provided between relatively displacing head constituents according to the present invention. The means for providing such spaces is herein referred to as the space-forming means. The wording "between relatively displacing head constituents" is herein understood to refer to, for instance, between the movable site of the actuator and the suspension, between the movable site of the actuator and the slider, and between the slider and the suspension. Preferably in the present invention a friction reducing means, i.e., a friction reducing means having a space-maintaining function is provided in at least one of the aforesaid spaces for the purpose of preventing any direct contact between the head constituents.

The movable site of the actuator used herein is understood to refer to a site that displaces relatively with respect to other head constituents. Referring back to FIG. 13, the movable site with respect to the suspension 3 is defined by the displacement-generating means 41, and the movable part 44. Again, the movable site with respect to the slider 2 is defined by the displacement-generating means 41, and the fixed part 43.

Then, exemplary constructions of the space-forming means and friction-reducing means are explained.

Figure 1A:
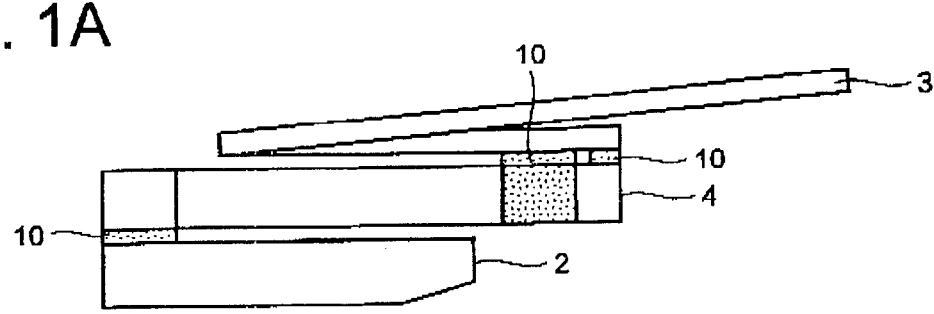
FIGS. 1A and 1B are side views of one exemplary construction of the magnetic head according to the first embodiment of the invention, wherein electrodes are used as the space-forming means.
Figure 1B:
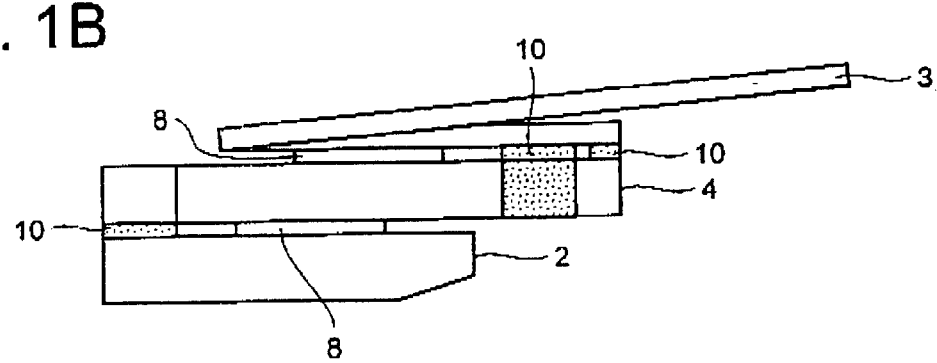
Figure 1C:
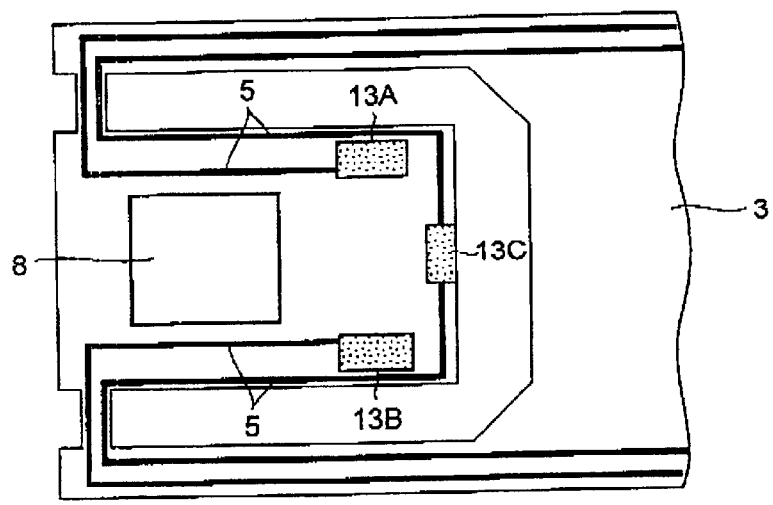
FIG. 1C is a plan view of one exemplary construction of the suspension used in the first embodiment.
Figure 1D:
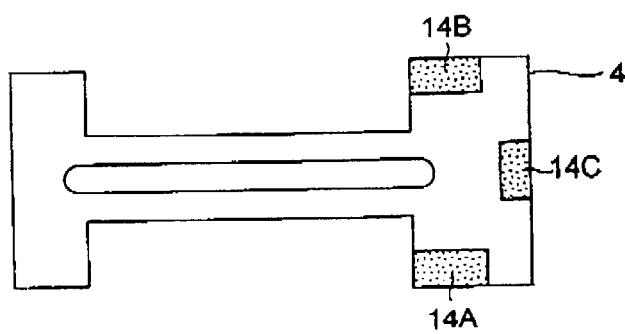
FIG. 1D is a plan view of one exemplary construction of the actuator used in the first embodiment.

In the first embodiment of the invention, an electrode provided between the surface of the actuator and the surface of the suspension and/or an electrode provided between the surface of the actuator and the surface of the slider are used as the aforesaid space-forming means. This embodiment is explained with reference to FIGS. 1A, 1B, 1C and 1D. Referring to FIG. 1A, an electrode 10 is located between the surface of an actuator 4 and the surface of a suspension 3 while an electrode 10 is located between the surface of the actuator 4 and the surface of a slider 2, so that they can be used as the space-forming means. FIG. 1B illustrates a film form of friction-reducing means 8 located in the spaces shown in FIG. 1A.

Referring to FIG. 1B, the electrode 10 located between the surface of the actuator 4 and the suspension 3 is made up of a terminal electrode group which comprises a terminal electrode (for instance, see FIG. 1C) for connecting an actuator-driving interconnecting pattern 5 on the surface of the suspension 3 to an electrode layer in the actuator 4, a terminal electrode for making a connection between an interconnecting pattern (usually formed on the surface of the suspension 3 although not shown) connected to an electromagnetic transducer element and an interconnecting pattern (not shown) formed on the surface of the actuator 4, etc. On the other hand, the electrode 10 located between the surface of the actuator 4 and the surface of the slider 2 is provided to connect the interconnecting pattern formed on the surface of the actuator 4 to a terminal electrode of the electromagnetic transducer element provided on the slider 2. In this regard, it is noted that the slider 2 is electrically insulated from the electrode 10 by means of an insulting film or the like.

In this embodiment, it is acceptable that the space-forming means are obtained by forming, with the required total thickness, terminal electrodes 13A, 13B, 13C (see FIG. 1C) on the surface of the suspension 3 and terminal electrodes 14A, 14B, 14C (see FIG. 1D) on the surface of the actuator 4. Alternatively, the space-forming means may be obtained in the form of an assembly wherein other conductive members are sandwiched as electrodes between terminal electrode pairs. No particular limitation is imposed on how to form the electrodes to be used as the space-forming means. However, it is preferable to make use of processes enabling thick metal films to be formed with high dimensional accuracy, for instance, a plasma spray process or a screen printing process, partly because the electrodes are often required to be thicker than ordinary terminal electrodes, and partly because the electrodes have to be formed with high dimensional (thickness) accuracy so as to keep the surfaces of the head constituents with the electrodes in close contact relations thereto substantially parallel with each other.

Figure 2A:
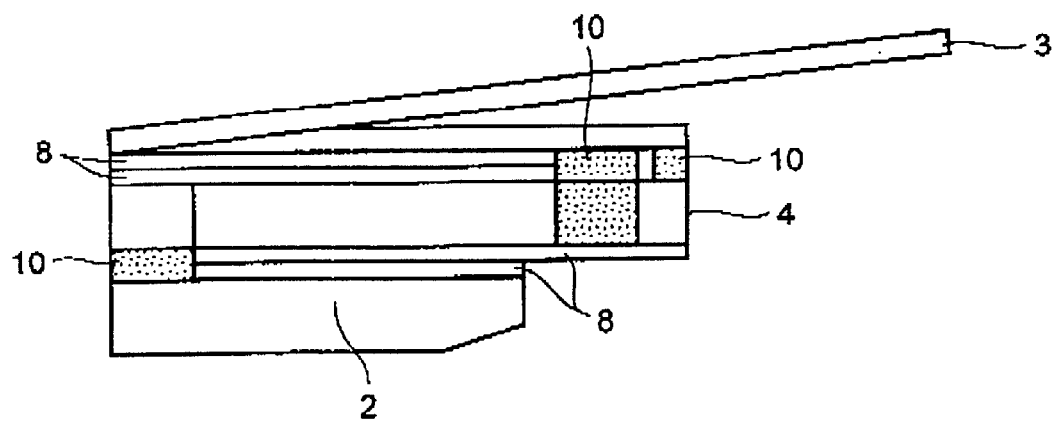
FIGS. 2A and 2B are side views of another exemplary construction of the magnetic head according to the first embodiment of the invention, wherein electrodes are used as the space-forming means.
Figure 2B:
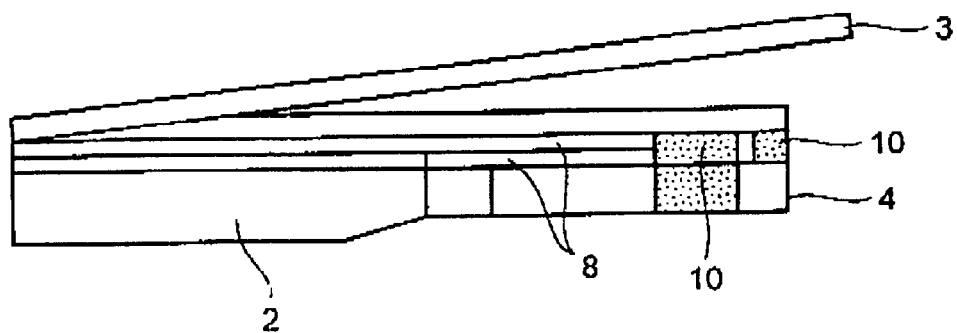

FIGS. 2A and 2B show two arrangements of the first embodiment, wherein friction-reducing means having different constructions are used. Referring to FIG. 2A, an actuator 4 is positioned on the back surface side of a slider 2 and spaces are formed by electrodes 10 between the actuator 4 and a suspension 3 and between the actuator 4 and the slider 2. Friction-reducing means 8, each in a film form, are provided in these spaces. In this arrangement, the friction-reducing means 8 are located on both opposite surfaces of the relatively displacing head constituents; they come in contact with each other. The arrangement shown in FIG. 2B, on the other hand, is the same as the FIG. 2A arrangement with the exception that the slider 2 is positioned on the side of the actuator 4.

Figure 3A:
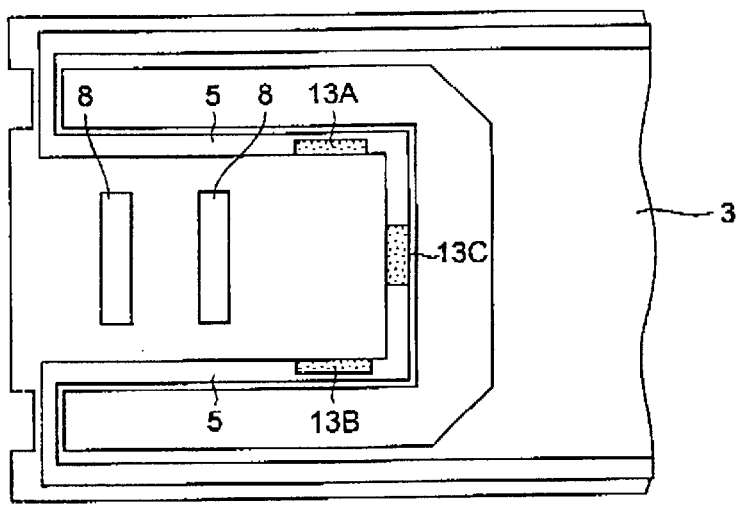
FIG. 3A is a plan view of one exemplary construction of the suspension used in the second embodiment of the invention, wherein an interconnecting pattern is used as the space-forming means.
Figure 3B:
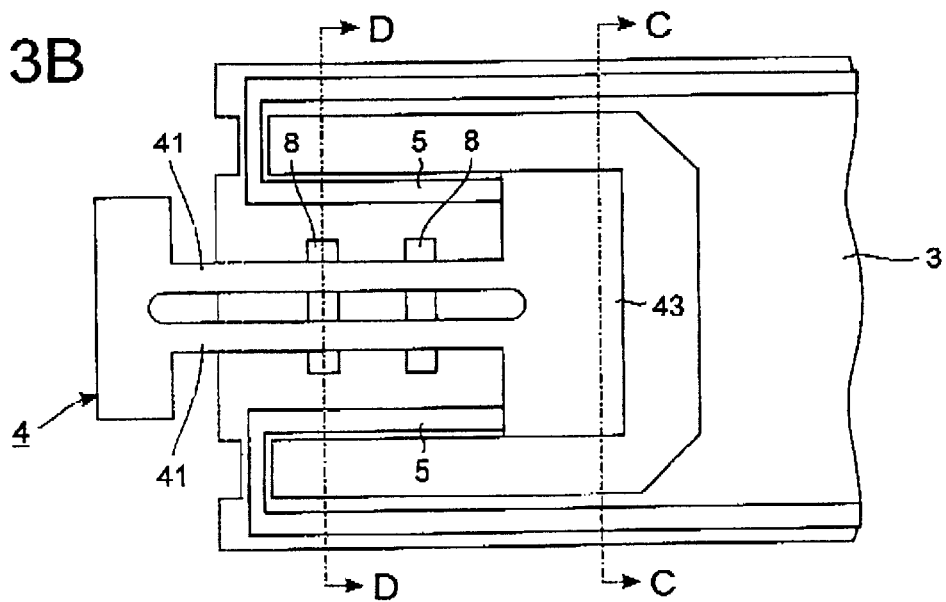
FIG. 3B is a plan view of the actuator mounted on the suspension shown in FIG. 3A.
Figure 3C:
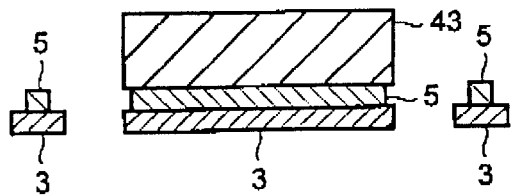
FIG. 3C is a sectional view taken along the C—C line in FIG. 3B.
Figure 3D:
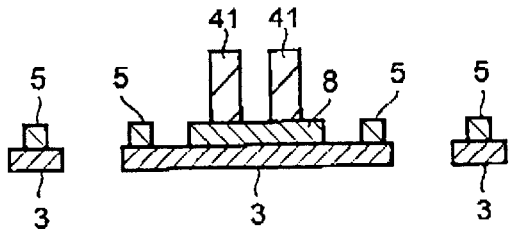
FIG. 3D is a sectional view taken along the D—D line in FIG. 3B.

In the second embodiment of the invention, electric wires provided between relatively displacing head constituents are used as the aforesaid space-forming means. This embodiment is now explained with reference to FIG. 3A, FIG. 3B, FIG. 3C and FIG. 3D. Referring to FIG. 3A, an interconnecting pattern 5 on the surface of a suspension 3 is made up of an interconnecting film having a structure wherein conductors are covered with a resin layer. A part of the conductors is uncovered to form terminal electrodes 13A, 13B, 13C for connection to the actuator. FIG. 3B shows an actuator 4 bonded to the suspension 3 illustrated in FIG. 3A. FIG. 3C is a sectional view taken along the C—C line in FIG. 3B, and FIG. 3D is a sectional view taken along the D—D line in FIG. 3B. Regarding FIGS. 3C and 3D, it is noted that only cut sections are shown; nothing is shown in the depth direction.

As shown in FIG. 3O, a fixed part 43 of the actuator 4 is bonded onto the interconnecting pattern 5. As can be seen from FIG. 3D, on the other hand, displacement-generating means 41, 41 displacing relatively with respect to the suspension 3 are spaced away from the surface of the suspension 3 by a distance corresponding to the thickness of the interconnecting pattern 5, so that a space is formed between both. With this arrangement, it is thus possible to provide undisturbed displacements of the displacement-generating means 41, 41. In the arrangement illustrated, a film form of friction-reducing means 8 is provided in the space formed by the space-forming means. Alternatively, an interconnecting pattern formed on the surface of the actuator 4 with the required thickness may be used as the space-forming means. Still alternatively, both interconnecting patterns formed on the surface of suspension and the surface of the actuator may be used as the space-forming means. While reference is here made only to the space between the actuator and the suspension, it is understood that the space between the actuator and the slider, too, may be formed by using an interconnecting pattern or patterns formed on the surface of the actuator and/or on the surface of the slider.

Figure 4:
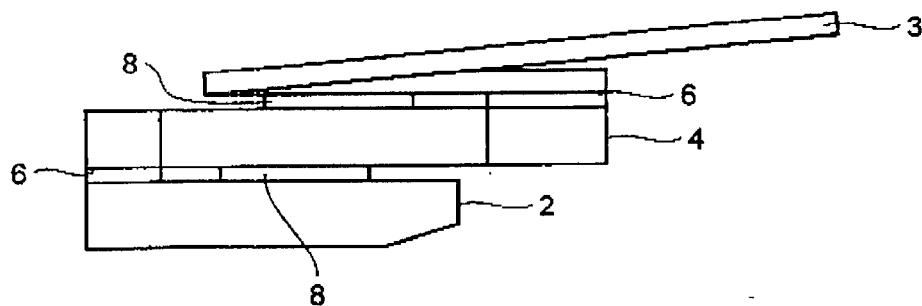
FIG. 4 is a side view of one exemplary construction of the magnetic head according to the third aspect of the invention, wherein bonding members are used as the space-forming means.

In the third embodiment of the invention, bonding members provided between relatively displacing head constituents are used as the aforesaid space-forming means. This embodiment is now explained with reference to FIG. 4. Referring to FIG. 4, there is a bonding member 6 between the surface of an actuator 4 and the surface of a suspension 3 while there is a bonding member 6 between the surface of the actuator 4 and the surface of a slider 2. These bonding members 6 are provided to bond the head constituents of a magnetic head together. In this embodiment of the invention, however, the bonding mourners 6 are formed with the required thickness, whereby they can be used as the space-forming means. In the illustrated embodiment, a film form of friction-reducing means 8 is provided in the space defined by the space-forming means. The bonding member may be formed by coating a bonding agent on at least one surface of two head constituents to be bonded together in such a manner that it has the required thickness upon bonding or sticking bonding sheet thereto. It is noted, however, that the bonding member is not necessarily made up of a bonding agent alone; that is, it may comprise a substrate formed of a rigid or flexible material and embedded in an adhesive layer. For instance, if an adhesive layer with a hard filler dispersed therein is used as a bonding member, the bonding member can then have a uniform thickness within its plane. It is thus possible to make the bonding member thin to the necessary minimum level. It is also possible to keep the surfaces of the head constituents with the bonding members stuck thereto substantially parallel with each other. This in turn enables an electromagnetic transducer element 1 to be rolled and pitched by the actuator 4 in a plane substantially parallel with the surface of a disk medium. In both the first and second embodiments of the invention, it is noted that the surfaces of contact of the head constituents with the space-forming means should preferably be substantially parallel with each other.

Figure 5A:
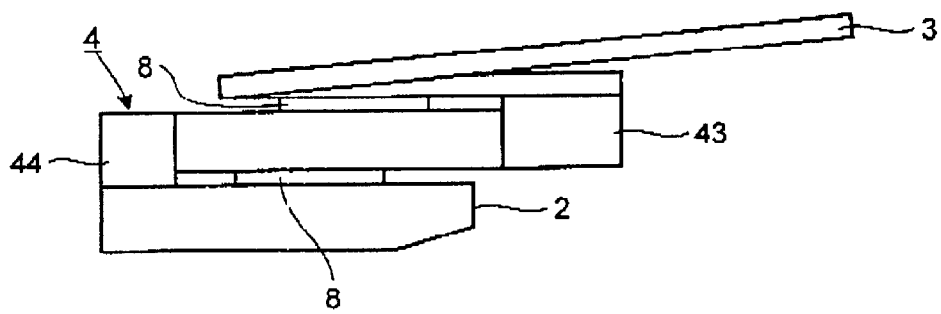
FIGS. 5A and 5B are side views of one exemplary construction of the magnetic head according to the fourth embodiment of the invention, wherein a step or steps provided on the surface of the actuator and/or on the surface of the slider are used as the space-forming means.
Figure 5B:
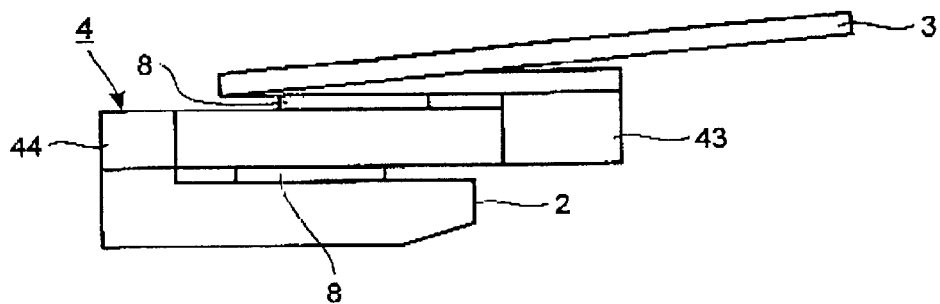

In the fourth embodiment of the invention, a step or steps formed on the surface of the actuator and/or on the surface of the slider are used as the aforesaid space-forming means. This embodiment is now explained with reference to FIGS. 5A and 5B. Referring to FIG. 5A, a step is provided on the upper surface of an actuator 4 so that a fixed part 43 can be upwardly extended to form a space between the actuator 4 and a suspension 3. Likewise, a step is provided on the lower surface of the actuator 4 so that a movable part 44 can be downwardly extended to form a space between the actuator 4 and a slider 2. In the illustrated embodiment, friction-reducing means 8, each in a film form, are provided in the spaces formed by the space-forming means. On the other hand, FIG. 5B is the same as FIG. 5A with the exception that, instead of providing a step on the lower surface of an actuator 4, a step is provided on the upper surface of a slider 2 so that a part of the upper surface can be upwardly extended to form a space between the actuator 4 and the slider 2. With the step provided on the actuator or slider, it is thus possible to reduce dimensional errors in the spaces and errors in assembling. In the fourth embodiment of the invention, too, both opposite surfaces of the head constituents should preferably be substantially parallel with each other.

In the present invention, the aforesaid first to fourth embodiments may be used in combination of two or more. For instance, the means for forming the space between the actuator and the suspension may be different from the means for forming the space between the actuator and the slider.

In the present invention, the space-forming means on each of the suspension, actuator and slider should preferably be located symmetrically with respect to the center axis thereof parallel with the direction of extension of the suspension. For instance, the terminal electrodes 13A, 13B, 13C shown in FIG. 1B, the terminal electrodes 14A, 14B, 14C shown in FIG. 1C and the interconnecting pattern 5 shown in FIG. 3A are all located symmetrically with respect to the center axis parallel with the direction of extension of the suspension 3 (the horizontal direction on the drawing paper). Such symmetric arrangements stabilize the floating state of the slider under a load on the head, and improve the stability of the actuator while it is driven.

In the present invention, it is preferable that the space-forming means are made up of three or more units and at least three units of said three or more units are not linearly arranged, as typically illustrated in FIG. 1B. The terminal electrodes 13A, 13B and 13C in FIG. 1B are the aforesaid units, which are not linearly arranged. By arranging at least three units in this way, constant spaces can easily be maintained between the actuator and other head constituents. This in turn enables the slider to be easily rolled and pitched by the actuator 4 in a plane substantially parallel with the surface of a disk medium.

In the present invention, the size of the spaces provided between the head constituents may be determined such that no interference occurs during the relative displacement thereof, while loads produced by the suspension and the rigidity of the head constituents are taken into consideration. However, the space size should preferably be 5 μm and 50

μm, and especially between 10 μm and 30 μm. Too narrow spaces may cause the head constituents to come in contact with each other while the actuator is driven. On the other hand, too wide spaces incur ah increase in the thickness of the magnetic head, and a decrease in the rigidity thereof.

The thickness of the friction-reducing means may be determined depending on the length of the spaces provided between the head constituents; it may be substantially equal to that length. However, if the thickness of the friction-reducing means is restricted depending on what material is used for the friction-reducing means and how to form the friction-reducing means, it is then preferable that the space length is determined in association with the thickness of the friction-reducing means.

The friction-reducing means provided in the aforesaid spaces are now explained in further detail.

If spaces are provided between head constituents as mentioned above, it is then possible to prevent the head constituents from coming in contact with each other in a normal state. However, if the spaces are provided between the head constituents, it is likely that the head constituents deflect or collide with each other due to external forces applied on a head or the whole of a magnetic disk system. Upon deflection of the head constituents, the displacement capability of an actuator may be impaired or the flying amount of a slider may become inaccurate. When the head constituents collide with each other, on the other hand, they may possibly break down or the displacement capability of the actuator may be impaired. However, if friction-reducing means are provided to prevent opposite head constituents from coming in contact with each other, the impact resistance of the head increases and any increase in the friction between the head constituents is avoidable. By the provision of the friction-reducing means, the head can be assembled with high accuracy because the spaces between the head constituents can easily be adjusted to a given length. When only the spaces are provided, it is preferable to ensure assembly accuracy by the temporal insertion of spacers in the spaces. However, it the friction-reducing means are used instead of these spacers, it is then unnecessary to remove the spacers during fabrication, resulting in a reduction in the number of steps and an increase in fabrication yield. More specifically, when the head is assembled, the positioning of the actuator in its height direction can be so facilitated that control of the spacing and parallelism between opposite head constituents can be easily gained.

In the present invention, a lubricant, a film composed mainly of an organic material or an inorganic material, or a protuberance extending from at least one of two head constituents with a space located therebetween may be used as the friction-reducing means.

Incidentally, U.S. Pat. No. 5,856,896 discloses at fourth column, second paragraph that a compliant shear layer (preferably a mylar film (polyester film)) is coupled between the slider support beam extending from the flexure forming a part of the suspension to permit relative lateral motion between both, and that a lubricant (a common disk lubricant) is provided to reduce wear and debris caused by relative movement of both.

The mylar film set forth in the aforesaid publication is bonded to both relatively displacing head constituents (the slider support beam and the slider), and so shear force occurs in the mylar film in association with the relative displacement of both head constituents. The mylar film, because of being not a rigid member, deflects upon receipt of the shear force. This is considered to permit relative motion between the head constituents. However, an actuator of a magnetic head has a high operating (response) frequency during tracking. Resin films such as mylar film are generally less susceptible to deflection. For this reason, when the resin film is sandwiched between and bonded to both head constituents, there is a possibility that the resin film cannot well follow the displacement of both head constituents, resulting in an impairment in the displacement capability of the actuator. A problem with resin films inclusive of the mylar film is that their displacement capability is likely to be affected by environmental temperature changes because their flexibility is generally dependent on temperature.

Even when a common disk lubricant is used instead of the mylar film, it is impossible to prevent a collision between head constituents due to external force.

In view of such prior arts, the present invention uses as the friction-reducing means a lubricant containing a solid particle having a particle diameter substantially equal to the length of the space. For the solid particle, particles usable as a solid lubricant and having high lubricating properties such as graphite particles and molybdenum disulfide particles are preferred. Other solid particles such as alumina particles and calcium carbonate particles, too, are acceptable. Even in this case, friction becomes lower as compared with the case where head constituents come in contact with each other. In addition to these inorganic particles, it is acceptable to use organic particles composed of resins such as fluorine base polymers. To keep the length of spaces between the head constituents constant and reduce friction with respect to the head constituents the solid particles should preferably have a substantially spherical shape and a uniform particle diameter.

To prevent scattering of solid particles while the actuator is driven and obtain a further reduction in the friction with respect to the head constituents, however, it is preferable to use a lubricant with solid particles dispersed in a semi-solid and/or a liquid. For the semi-solid or liquid, it is preferable to use a semi-solid or liquid that is in itself a lubricant, i.e., a semi-solid or liquid lubricant. Even when solid particles having low lubricating properties are used, it is thus possible to reduce friction to a sufficiently low level. It is here noted that when used in combination with solid particles having high lubricating properties, the semi-solid or liquid should preferably function only as a preventive against scattering of the solid particles; it is not required to have lubricating properties.

For the semi-solid lubricant, for instance, grease may be used. For the liquid lubricant, for instance, fluorine base oils may be used.

No particular limitation is imposed on how to incorporate the lubricant in the spaces. For instance, the lubricant may be coated or otherwise formed on the surfaces of head constituents before they are assembled together. Alternatively, the lubricant may be pored into the spaces between head constituents after assembling. In the former case, it is unnecessary to provide spacers so as to maintain the length of spaces during assembling.

The film used as the friction-reducing means is now explained. The aforesaid U.S. Pat. No. 5,856,896 discloses mylar films bonded to both relatively displacing head constituents (the slider support beam and the slider). In the present invention, on the other hand, the film used as the friction-reducing means is either fixed to only one of two head constituents with a space located between them, or unfixed to any of two head constituents with a space located between them. Even when an actuator has a high operating (response) frequency during tracking, it is thus it unlikely that the displacement capability of the actuator is impaired.

The film used as the friction-reducing means in the invention comprises an organic or inorganic material as a main component, and is a low-friction film which is reduced in terms of friction with respect to head constituents and another similar film.

To obtain the loin-friction film fixed to only one of two head constituents with a space located between them, the low-friction film may be formed on the surface of one head constituent by means of thin-film techniques such as sputtering, evaporation or CVD or coating techniques such as screen printing, dipping or spraying. At this time, patterning may further be carried out to form discrete low-friction film sections at plural sites. It is also possible to make use of a process where one or more independent films are stuck to head constituents. If one low-friction film is divided into a plurality of sections dispersed in the space, it is then possible to reduce the area of contact of the low-friction film with head constituents or the area of contact of the film sections while the stability of a slider is ensured during driving, thereby making friction much lower.

When the low-friction film fixed to only one of two head constituents is used as the friction-reducing means, no particular limitation is placed on which head constituent is provided with the low-friction film. However, it is preferable to form the low-friction film on an actuator for the following reasons. When such piezoelectric actuators as used herein are fabricated, an electrode pattern is first stacked on a large-area piezoelectric substrate. This step of stacking the electrode pattern on the piezoelectric substrate is repeated to obtain preforms including a multiplicity of actuator patterns. Then, each preform is cut by a cutter or divided by punching out it by blowing particles thereto to obtain a multiplicity of actuators in one operation. If, in such a fabrication process, the low-friction film is formed on a main surface of at least one of the preforms prior to the cutting or punching-out of the preform, it is then possible to minimize an increase in the amount of labor due to the provision of the low-friction film. As typically shown in FIG. 2A, it is preferable that the low-friction film is not formed on a region of the surface of the actuator, which bonds to other head constituents. This is to prevent an impairment of bonding force. To this end, it is thus preferable to carry out patterning using a mask or the like when the low-friction film is formed on the main surface of the preform or form the low-friction film on the main surface of the preform, followed by removal of a part thereof. When the slider or suspension is bonded to the side of the actuator, on the other hand, it is possible to form the low-friction film all over the main surface of the preform. However, it is noted that too large a film-forming area may often cause an impairment in the displacement of the actuator. With this in mind, it is thus preferable to determine the film-forming area.

Figure 6A:
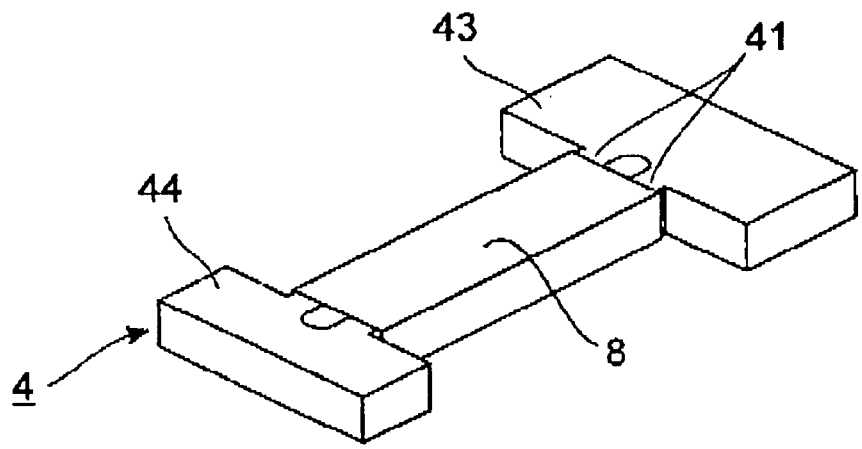
FIG. 6A is a perspective view of the actuator provided with friction-reducing means.
Figure 6B:
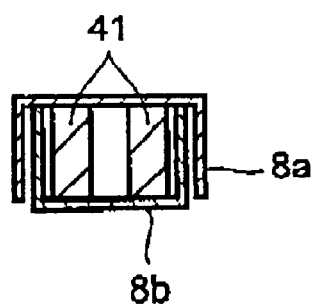
FIG. 6B is a side view of FIG. 6A.

To allow the low-friction film to remain unfixed to any of two head constituents with a space located between them, it is preferable to insert an independent low-friction film between opposite head constituents. FIG. 6A shows an embodiment of the invention wherein displacement-generating means 41 of an actuator 4 are covered with friction-reducing means 8 comprising fluorine base polymer films. As shown in a sectional view attached hereto as FIG. 6B, the friction-reducing means 8 comprise two films 8a and 8b, each bent at both ends. The films 8a and 8b are arranged such that the displacement-generating means 41 are sandwiched between them, and come in contact with a suspension and a slide, respectively, in a stage where the magnetic head supporting mechanism is assembled.

It is acceptable to coat the lubricant on the surface of the low-friction film; it is acceptable to provide the low-friction film in a part of the space and fill the lubricant in a region with no low-friction film provided thereon. For this lubricant, it is preferable to use the semi-solid or liquid lubricant; however, it is acceptable to use the aforesaid solid particle-containing lubricant.

Preferable for the low-friction film composed mainly of an inorganic material is a diamond-like carbon (DLC) film, and preferable for the low-friction film composed mainly of organic material is a fluorine base polymer film such as a polytetrafluoroethylene film, because of their low friction and good wear resistance.

The DLC film is of low friction because of having high hardness and because its surface can be made smooth. The DLC film can be made thin because sufficient bonding force and mechanical strength are obtainable even when it is a very thin form. Accordingly, the DLC film is less susceptible to elastic deformation and, hence, distortion upon loads applied on the slider, and shear force applied thereon in association with the displacement of the slider by the actuator. When the actuator is driven while the slider is flying over a medium, it is thus possible to prevent any impairment in the displacement of the slider.

The DLC film is often referred to as an i-carbon thin film or the like. For instance, the diamond-like carbon thin film is disclosed in JP-A 11-278990. The DLC shows a broad (1,520 to 1,560 cm$^{-1}$) Raman absorption peak at 1,550 cm$^{-1}$, as identified by Raman spectroscopic analysis. Thus, the DLC is a substance clearly different in structure from diamond and graphite showing a sharp peak at 1,333 cm$^{-1}$ and 1,581 cm$^{-1}$, respectively, as identified by Raman spectroscopic analysis. The DLC film is an amorphous form of thin film which contains carbon and hydrogen as main components and in which carbon-carbon sp$^3$ bonds are randomly present. The DLC has usually an atomic C to H ratio of the order of 95 to 60:5 to 40. As indicated in the aforesaid publication, the DLC film may contain at least one of various elements such as Si, N, O and F in addition to carbon and hydrogen. The DLC film may be formed by a plasma CVD process, an ionizing evaporation process, a sputtering process, etc.

It is noted that the fluorine base polymer film foxed to only one of the head constituents should preferably be formed as by a coating process or a thin-film technique.

As shown in FIG. 1B and FIG. 2A, respectively, the low-friction films may be provided on one of two opposite head constituents with a space located between them or both.

Reference is now made to an embodiment of the invention, wherein a protuberance extending from one two head constituents with a space located between them is used as the friction-reducing means.

Figure 7A:
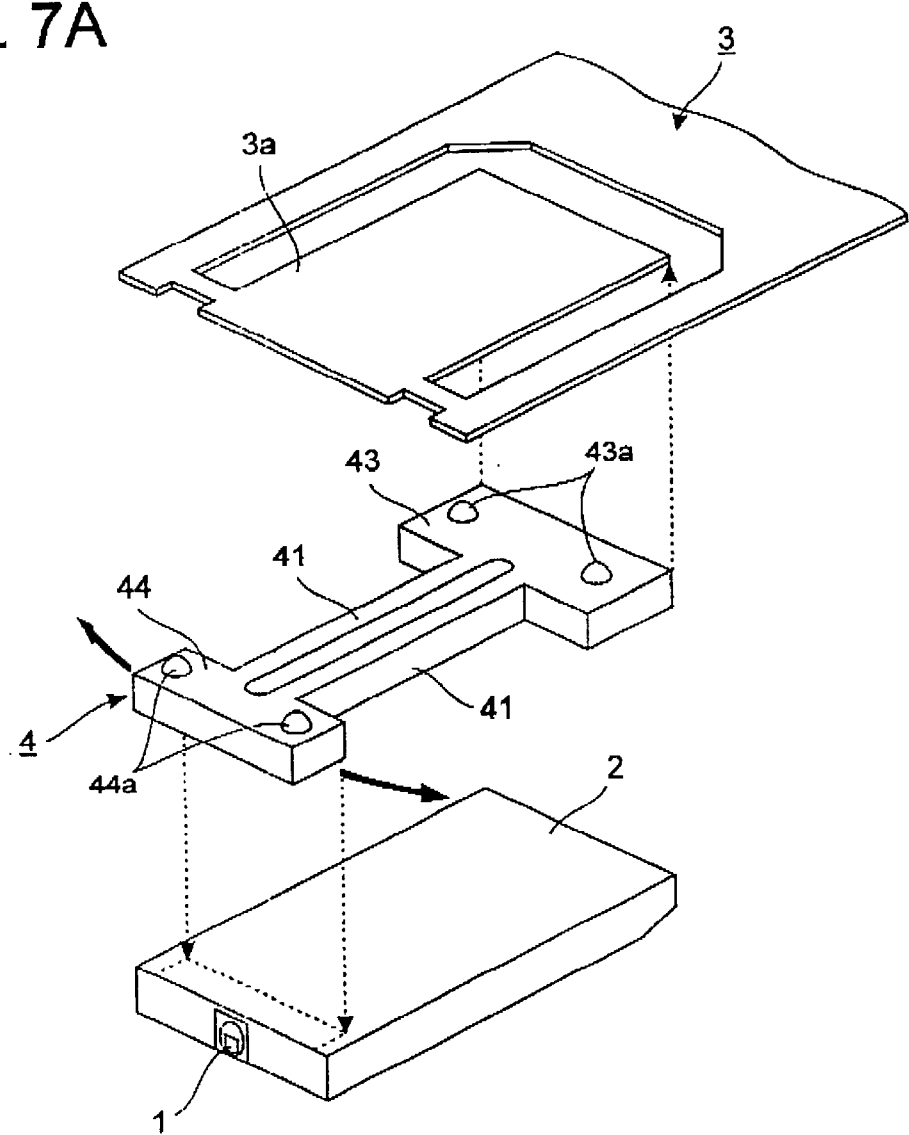
FIG. 7A is an exploded perspective view of one exemplary construction of the magnetic head supporting mechanism according to the invention.
Figure 7B:
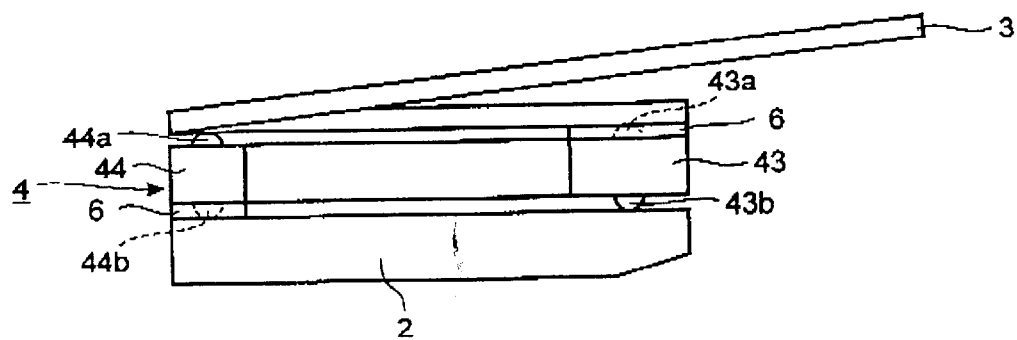
FIG. 7B is a side view of the magnetic head supporting mechanism shown in FIG. 7A.

One exemplary construction of the friction-reducing means is shown in an exploded perspective view attached hereto as FIG. 7A, and in a side view attached hereto as FIG. 7B. In this exemplary construction, two protuberances 43a are provided on a surface of a fixed part 43 of an actuator 4, which surface is opposite to a suspension 3, and two protuberances 43b are provided on a surface of the fixed part 43, which surface is opposite to a slider 2. Likewise, two protuberances 44a are provided on a surface of a movable part 44 of the actuator 4, which surface is opposite to the suspension 3, and two protuberances 44b are provided on a surface of the movable part 44, which surface is opposite to the slider 2.

Of these protuberances, the protuberances 44a and 43b function as the friction-reducing means. On the other hand, the protuberances 43a and 44b are allowed to be present in bonding members 6, thereby forming a part of the space-forming means. In this actuator, the upper and lower protuberances are formed at a symmetrical position, and so no attention is paid to the upper vs. lower relation of the actuator when the magnetic head is assembled.

The protuberances 44a and 43b functioning as the friction-reducing means can be extremely reduced in terms of their areas of contact with the suspension 3 and slider 2, so that when no substantial load is applied between these head constituents and the protuberances, friction can be extremely reduced. Referring here to the number of protuberances functioning as the friction-reducing means, at least one protuberance should preferably be provided for each space. The lesser the protuberances, the smaller the friction becomes. As the number of protuberances increases, on the other hand, it is possible to reduce load for each protuberance, because loads produced as by collision can then be dispersed. Although there is no upper limit to the number of protuberances, it is usually preferable to use five protuberances or less. The protuberance functioning as the friction-reducing means may have a flat end. However, it is preferable that a portion of the protuberance near to the end is defined by a curved surface, for instance, a hemispherical surface as illustrated, because it is possible to considerably reduce friction in the absence of load. When the end of the protuberance is defined by a curved surface, no particular limitation is imposed on the size of the protuberance. When the end of the protuberance is defined by a flat surface, the end of the protuberance should preferably have a relatively small diameter of the order of 30 to 100 $\mu$m for instance.

If the hard filler is dispersed in the adhesive layer used as the space-forming means as already mentioned, it is then easy to keep the surfaces of the head constituents substantially parallel; with each other. The protuberances 43a and 44b functioning as a part of the space-forming means have the same effect as the aforesaid hard filler. The number of the protuberance functioning as the friction-reducing means and the protuberance functioning as the space-forming means should preferably be at least three in all. The provision of three or more protuberances in all makes it easy to keep the surfaces of opposite head constituents parallel with each other. If three protuberances or more are present on the lower surface of the actuator 4 as illustrated, the actuator 4 can then be easily positioned with respect to a jig when the jig is used to bond the suspension 3 to the actuator 4, because the actuator 4 is mounted horizontal with respect to the jig.

The protuberances functioning as the friction-reducing means and the protuberances functioning as the space-forming means should preferably be formed at the same time so as to achieve productivity improvements. Although no particular limitation is imposed on how to form the protuberances, it is understood that such a hemispherical protuberance as illustrated may be formed by the process which is explained below as an example. First, a paste comprising glass powders having a relatively low melting point and a binder is coated on a given head constituent by means of screen printing or a dispenser in a spotted state. Then, the coating is thermally treated to melt the glass, thereby obtaining a hemispherical protuberance. The thermal treatment conditions may be determined depending on the physical properties of the glass powders used. Preferably, however, the coating should be thermally treated at a temperature of the order of 500 to 800° C. and especially 600 to 700° C. in the air.

No particular limitation is imposed on what material is used for the protuberances, inorganic materials (e.g., DLC and metal) other than glass and organic materials such as resins (e.g., fluorine base polymers) may be used. The protuberances formed of these materials may be formed by thin-film techniques using a mask or screen printing. Alternatively, the protuberance may be constructed of a protuberance body and a covering film for covering the vicinity of the end of the body. In this case, it is acceptable to form protuberance bodies of glass or the like, and then form low-friction films such as fluorine base polymer films or DLC films on the protuberance bodies in such a manner that at least the vicinities of the ends of the bodies are covered therewith.

Although the protuberances are formed on the actuator in the illustrated embodiment, it is understood that they may also be formed on other head constituent. In this regard, it is noted that if a screen printing process or the like is used to form a multiplicity of protuberances on at least one of large-area actuator preforms in one operation and then divide the actuator preform into individual actuators, some considerable productivity improvements are then achievable as in the case of the aforesaid low-friction films. For this reason, it is preferable to provide the protuberance on the actuator. In this regard, an actuator making use of a piezoelectric material is preferable by reason of its relatively high heat resistance, because it can be thermally treated after coated thereon with a glass or metal paste. When the protuberance is provided on the slider, for instance, it is preferable to make use of a sputtering process for the purpose of averting any adverse influence on the electromagnetic transducer element due to temperature increases.

The thickness of the friction-reducing means should be determined such that the friction-reducing means come in contact with the head constituents while no load is applied on the slider; that is, the thickness is substantially equal to the length of the space. It is thus possible to prevent any collision between head constituents opposite to each other with a space located therebetween, and minimize friction increases. More specifically, the friction-reducing means should preferably have a thickness of generally 5 nm to 50 $\mu$m, and especially 10 nm to 30 $\mu$m, although varying with what material is used therefor. Too thin friction-reducing means make it difficult to obtain sufficient mechanical strength, and may possibly break down and malfunction due to contact with the heat constituents or contact with each other. On the other hand, too thick friction-reducing means are likely to decrease in rigidity, resulting in increased friction. However, this is not true of a DLC film. Also, too thick friction-reducing means ate not preferable because of an increase in magnetic head thickness.

If required, electrical conductivity should be imparted to the friction-reducing means. A slider is often electrically charged due to friction with air, etc., because it floats at a very small height over a medium rotating at high speed. In some cases, the slider is electrically charged by CSS (contact start stop). When the slider is electrically charged, an electromagnetic transducer element or an optical module may possibly break down due to static electricity. If the friction-reducing means with electrical conductivity imparted thereto are arranged in such a pattern as to enable static electricity to escape in the order of slider→actuator→suspension by way of the friction-reducing means, it is then possible to prevent any electrostatic breakdown of the electromagnetic transducer element or optical module. No particular limitation is imposed on how to impart electrical conductivity to the friction-reducing means. For instance, when solid particle-containing lubricants are used as the friction-reducing means, graphite particles or other particles having electrical conductivity should be used. It is also possible to make use of low-friction films doped with conductive elements. Furthermore, it is possible to construct the protuberances of conductive materials.

Of the aforesaid space-forming means, the bonding members 6 shown in FIG. 4 and the protuberances 43a and 44b shown in FIG. 7B, too, should preferably have electrical conductivity for the same reasons as mentioned just above.

Reference is now made to magnetic heads wherein the structure of the suspension is different from that explained above.

Figure 8:
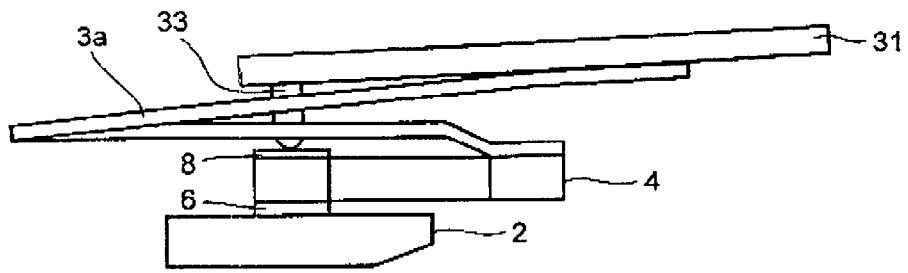
FIG. 8 is a side view of one exemplary construction of the magnetic head, wherein a gimbal part of the suspension is used as the space-forming means.

One suspension embodiment shown in FIG. 8 has a structure comprising a suspension body 31, a gimbal part (flexure) 3a mounted on a leading end thereof, and a pivot 33 mounted on the leading end of the suspension body (load beam) 31. The pivot 33 passes through a through-hole (not shown) provided in the gimbal part 3a, and comes in contact with a film form of friction-reducing means 8 provided on a movable part of an actuator 4. The actuator 4 is located on the back surface side of the slider 2, and so the pivot 33 applies an initial load on the slider 2 by way of the friction-reducing means 8 and the aforesaid movable part.

Figure 9:
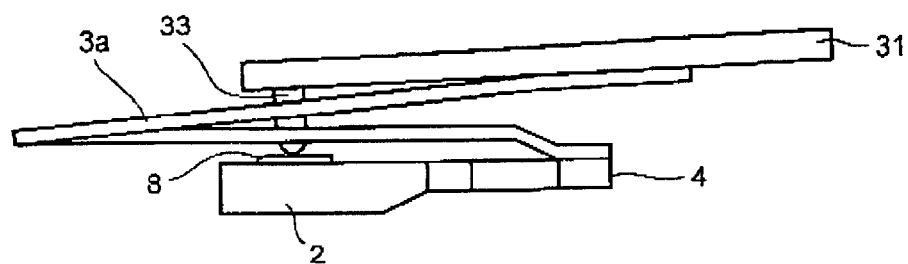
FIG. 9 is a side view of another exemplary construction of the magnetic head, wherein a gimbal part of the suspension is used as the space-forming means.

In another embodiment shown in FIG. 9, an actuator 4 is located on one side of a slider 2, and a pivot 33 comes in contact with a film form of friction-reducing means 8 provided on the back surface of the slider 2. In this embodiment, the pivot 33 directly applies an initial load on the slider 2.

Figure 10:
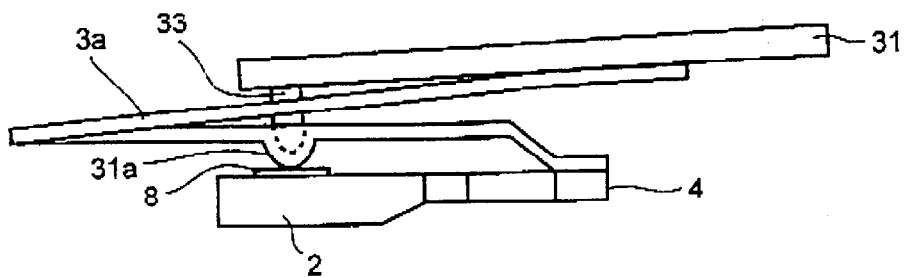
FIG. 10 is a side view of yet another exemplary construction of the magnetic head, wherein a gimbal part of the suspension is used as the space-forming means.

In yet another embodiment shown in FIG. 10, a gimbal part 3a is provided with a recess, thereby forming a protuberance 31a protruding toward a slider 2, and a pivot 33 is inserted in the aforesaid recess. This embodiment is otherwise similar to that shown in FIG. 9. In this embodiment, the protuberance 31a comes in contact with friction-reducing means 8 on the back surface of the slider 2, and functions as a pivot. With this structure, it is possible to prevent any plane misalignment of the gimbal part 3a with the result that any plane misalignment of the slider 2 can be prevented, making any track misalignment of an electromagnetic transducer element unlikely to occur. By the term "plane misalignment" used herein is meant a misalignment in the plane direction of a medium. For instance, this misalignment is induced by the vibration of the suspension during seeking.

Figure 11:
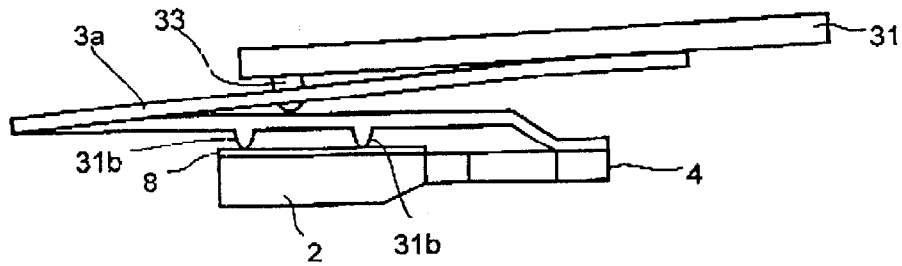
FIG. 11 is a side view of a further exemplary construction of the magnetic head, wherein the gimbal part of the suspension is used as the space-forming means.

In a further embodiment shown in FIG. 11, a gimbal part. 3a is provided with a plurality of recesses, thereby forming a protuberance 31b protruding toward a slider 2. A pivot 33 gives a push to the gimbal part 3a to apply an initial load to the slider 2. This embodiment is otherwise similar to that shown in FIG. 9. According to this embodiment wherein the protuberance 31b gives a push to a film form of friction-reducing means 8 provided on the back surface of the slider 2, it is possible to reduce the area of contact. Structures obtained by removing the film form of friction-reducing means 8 from the embodiments of FIGS. 8 to 11, too, are included in the present invention, because the pivot 33 and the protuberances 31a and 31b function as the friction-reducing means.

Preferably in the embodiments of FIGS. 8 to 11, the film form of friction-reducing means 8 should be of high rigidity, because loads are applied only on the points or surfaces of contact of the friction-reducing means 8 with the pivot 33 and the protuberances 31a and 31b and slips have to occur at these points or surfaces of contact. It is thus particularly preferable to use high-hardness yet high-durability DLC films as the friction-reducing means 8.

While, in FIGS. 3 to 11, a space is provided between the gimbal part 3a and the slider 2 by bending a part of the gimbal part 3a to form a step, it is understood that the aforesaid other space-forming means, too, may be used.

Figure 12A:
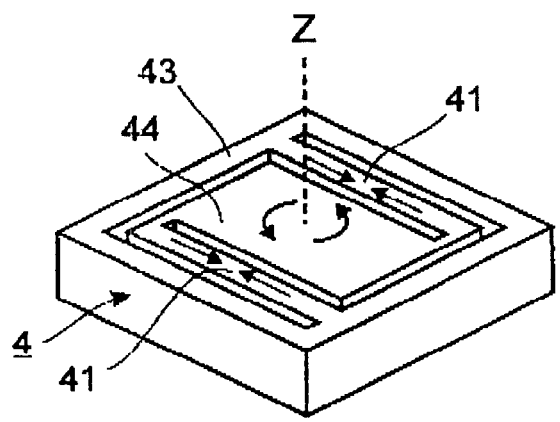
FIG. 12A is a perspective view of one exemplary construction of the actuator used herein.

Another embodiment of the actuator is shown in FIG. 12A. The actuator embodiment shown therein comprises a frame form of fixed part 43 forming an outside frame of the actuator, a movable part 44 surrounded with the fixed part 43 and two L-shaped displacement-generating means 41 and 41 for connecting the fixed and movable parts 43 and 44 together. The outside shape of the actuator is vertical with respect to plane, and rotationally symmetric with respect to an axis of symmetry (a Z-axis) passing through the center of the movable part 44. As the actuator is provided with voltage enough to allow both displacement-generating means 41 and 41 to contract or elongate at the same time, the movable part 44 makes a rotary motion around the aforesaid axis of symmetry, and so the slider bonded to the movable part 44, too, makes a rotary motion. As a result, the electromagnetic transducer element makes a circular orbit.

Figure 12B:
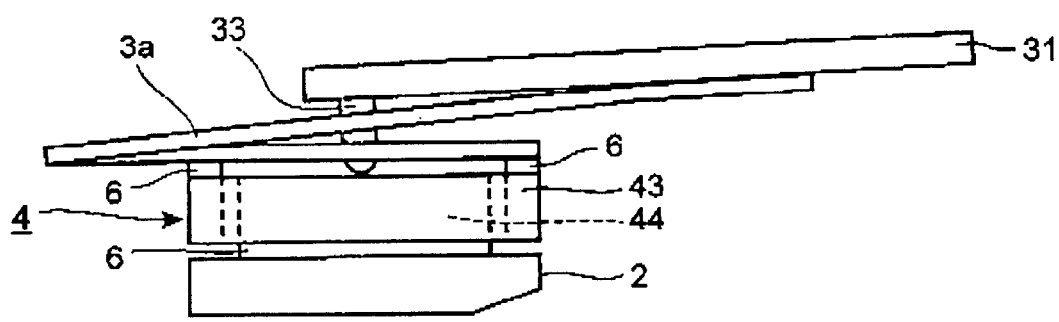
FIG. 12B is a side view of the magnetic head supporting mechanism using the actuator shown in FIG. 12A.

FIG. 12B is a side view of a magnetic head making use of this actuator. As shown therein, an actuator 4 is bonded to a gimbal part 3a and a slider 2 with bonding members 6, and the bonding members 6 form space-forming means. A suspension is substantially similar in structure to that shown in FIG. 8 with the exception that the gimbal part 3a is not used as the space-forming means. It is noted, however, that a pivot 33 provided at a leading end of a suspension body 31 gives force to the center of rotation of a movable part 44 to apply load thereto. In this embodiment, there is no substantial lateral friction between the pivot 33 and the movable part 44 while the actuator is driven. Thus, the friction between the movable part 44 and the pivot 33 in association with the driving of the actuator can be extremely reduced.

While explanation has been made with reference to the HDD magnetic head out of write/read heads, it is understood that the present invention may also be applied to an optical disk system. A conventional optical disk system makes use of an optical pickup comprising an optical module including at least a lens. This optical pickup is so designed that the lens can be mechanically controlled so as to be focused on the recording surface of the optical disk. In recent years, near field recording has been proposed to achieve ever-higher optical disk recording densities. In this regard, see "NIKKEI ELECTRONICS", Jun. 16, 1997. (No. 691), page 99. This near field recording makes use of a flying head which uses a slider like a slider used with a flying type magnetic head. Built in this slider is an optical module comprising a hemispherical lens called a solid immersion lens or SIL, a magnetic field modulation recording coil, and a prefocusing lens. Another flying head for near field recording is disclosed in U.S. Pat. No. 5,497,359. With higher recording densities, such a flying head, too, is increasingly required to have higher tracking precision as in the case of a HDD magnetic head. Thus, the micro-displacement actuator is also effective for the flying head. Accordingly, the present invention may also be applied to such a write/read head (optical head) for optical recording media.

More generally, the optical head to which the present invention can be applied comprises a slider similar to that in the aforesaid magnetic head, with an optical module built therein, or a slider which is in itself constructed of an optical module. The optical module comprises at least a lens, if required, with a lens actuator and a magnetic field generating coil incorporated therein. Such an optical head, for instance, includes not only a flying head for near field recording such as one mentioned just above but also an optical head wherein a slider is slidable on the surface of a recording medium, i.e., a pseudo-contact type or contact type optical head. To have an easy understanding of the case where the present invention is applied to the optical head, the electromagnetic transducer element in the foregoing explanation should be read as an optical head. It is understood that the present invention may also be applied to a pseudo-contact type or contact type magnetic head as well.

Conceptually, the term "write/read head" used herein shall include a write/read head, a write-only head, and a read-only head. Likewise, the term "write/read system" used herein shall include a write/read system, a write-only system, and a read-only system. The term "recording medium" used herein, too, shall include a read-only type medium such as a read-only optical disk in addition to a recordable medium.

EXPERIMENTAL EXAMPLE

To ascertain the advantages of the invention, the following experimentation was carried out.

Magnetic heads of such construction as shown in FIGS. 1A, 3A, 3B, 3C, 3D, 4, 5A and 5B were prepared. However, any film form of friction-reducing means 8 were not provided. In each magnetic head, the spaces between actuator 4 and suspension 3, and between actuator 4 and slider 2 had a length of 30 μm.

The actuator used was set out using PZT (piezoelectric constant $d_{31}=-200\times10^{-12}$ m/V) as a piezoelectric or electrostrictive material. When 10 V (DC bias voltage) ±10 V (sine wave driving voltage) was applied on both displacement-generating means in such a manner that when the phases of sine wave driving voltage were mutually inverted, the movable parts showed a displacement amount of about ±0.5 μm.

Using these magnetic heads, the actuator was driven under a head load of 2.5 g. Consequently, the amount of displacement was about ±0.5 μm while the spaces were maintained with no contact, indicating that the displacement capability of the actuator is not impaired.

Advantage of the Invention

According to the write/read head supporting mechanism of the invention wherein the space-forming means are provided to ensure spaces between the movable site of the actuator and other head constituents, it is possible to prevent contact and friction between the actuator and other head constituents. It is thus unlikely that the slider driving capability of the actuator (the positioning precision of the electromagnetic transducer element or optical module) is impaired. It is also possible to prevent reliability drops due to friction loads, collision loads, wear and dusting.

If, in the present invention, spaces of the necessary size are provided as by providing steps on the head constituents of the write/read head supporting mechanism or controlling the thicknesses of electrodes or adhesive layers during assembling, it is then possible to dispense with any special step of forming spaces, thereby slimming down fabrication cost.

If, in the present invention, given friction-reducing means are provided in the spaces, it is then possible to prevent failures and dusting which may otherwise be caused by contact between head constituents ascribable to impacts, loads, etc. Head assembly is also facilitated with high assembly accuracy. In addition, the slider driving capability of the actuator is not substantially impaired even when the friction-reducing means are provided.

Japanese Patent Application Nos. 10-341130, 11-200357 and 11-298336 are herein incorporated by reference.

The structures illustrated and described herein illustrate the principles of the invention. Modifications to the illustrated embodiments may be made without departing from the spirit and scope of the invention. Therefore the present invention includes the subject matter defined by the appended claims and all reasonable equivalents.

What is claimed is:

1. A write/read head supporting mechanism comprising a slider, a suspension and an actuator as relatively displacing head constituents, said slider being provided with an electromagnetic transducer element or an optical module, said slider being supported on said suspension by way of said actuator, and said slider being displaceable relatively with respect to said suspension by said actuator, wherein:

space-forming means are provided to form at least one space between at least two of said head constituents, said space-forming means being located where said head constituents oppose one another, and two of said head constituents are arranged in opposition to one another, and said at least one space has a size of 5 to 50 μm, and said actuator makes use of inverse piezoelectric effect or electrostrictive effect.

2. The write/read head supporting mechanism according to claim 1, wherein said space-forming means comprises at least one element selected from the group consisting of an electrode, an interconnecting pattern and a bonding member.

3. The write/read head supporting mechanism according to claim 2, wherein said bonding member has electrical conductivity.

4. The write/read head supporting mechanism according to any one of claims 1 to 3, wherein a step provided on at least one of said relatively displacing head constituents is used as said space-forming means.

5. The write/read head supporting mechanism according to claim 1, wherein said space-forming means are located symmetrically with respect to a center axis of each of said suspension, actuator and slider, which center axis is substantially parallel with a direction of extension of said suspension.

6. The write/read head supporting mechanism according to claim 5, where in said space-forming means is made up of three or more units, with at least three units of said three or more units being not linearly arranged.

7. The write/read head supporting mechanism according to any one of claims 1, 2, 3, 5, or 6, wherein a lubricant is present as friction-reducing means in at least one of said spaces, said lubricant containing a solid particle having a particle diameter substantially equal to a length of said spaces.

8. The write/read head supporting mechanism according to claim 7, wherein said lubricant has said solid particle disperses in a semi-solid and/or a liquid.

9. The write/read head supporting mechanism according to claim 7, wherein said lubricant has electrical conductivity.

10. The write/read head supporting mechanism according to any one of claims 1, 2, 3, 5, or 6, wherein at least one of said spaces bas as said friction-reducing means and/or said space forming means at least one protuberance extending from at least one of two head constituents un said space located therebetween, said protuberance having a height substantially equal to a length of said space.

11. The write/read head supporting mechanism according to claim 10, wherein said protuberance is provided with a curved surface in the vicinity of an end thereof.

12. The write/read head supporting mechanism according to claim 10, wherein said protuberance comprises a protuberance body and a covering film for covering at least the vicinity of an end thereof, said covering film being formed of a material having a coefficient of friction lower than that of said protuberance body.

13. The write/read head supporting mechanism according to claim 10, wherein said protuberance is formed on said actuator.

14. The write/read head supporting mechanism according to claim 10, above, wherein said protuberance has electrical conductivity.

15. The write/read head supporting mechanism according to claim 1, which includes a main actuator for driving said suspension, such that the write/read head supporting mechanism is movable relative to a disk medium.

16. A write/read system which comprises a write/read head supporting mechanism as recited in claim 1.

17. The write/read head supporting mechanism according to claim 6, wherein a surface of said actuator and a surface of said suspension which are opposite to each other with said space located therebetween are substantially parallel with each other.

18. The write/read head supporting mechanism according to claim 6, wherein a surface of said actuator and a surface of said slider which are opposite to each other with said space located therebetween are substantially parallel with each other.

19. The write/read head supporting mechanism according to claim 1, wherein an interconnecting wire interconnecting said suspension to said actuator is formed on said suspension.

20. The write/read head supporting mechanism according to claim 1, wherein an interconnecting wire interconnecting said suspension to said slider is formed on said suspension.

21. The write/read supporting mechanism according to claim 1, wherein said space-forming means comprises at least one element selected from the group consisting of an electrode, an interconnecting pattern, and a bonding member, and wherein said selected element has electrical conductivity.

22. A write/read head supporting mechanism comprising a slider, a suspension and an actuator as relatively displacing head constituents, said slider being provided with an electromagnetic transducer element or an optical module, said slider being supported on said suspension by way of said actuator, and said slider being displaceable relatively with respect to said suspension by said actuator, wherein:

space-forming means are provided to form at least one space between at least two of said head constituents, said space-forming means being located where said head constituents oppose one another, and two of said head constituents are arranged in opposition to one another, and at least one film composed mainly of an organic material or an inorganic material is present as a friction-reducing means, said film having a thickness substantially equal to a length of said at least one space, said friction-reducing means being fixed to a surface of only one of said two of said head constituents with said at least one space located between said two of said head constituents, and said friction reducing means being unfixed to any one of said two head constituents.

23. The write/read head supporting mechanism according to claim 22, wherein said film has electrical conductivity.

* * * * *

UNITED STATES PATENT AND TRADEMARK OFFICE
CERTIFICATE OF CORRECTION

PATENT NO. : 6,381,104 B1 Page 1 of 1
DATED : April 30, 2002
INVENTOR(S) : Yoshikazu Soeno et al.

It is certified that error appears in the above-identified patent and that said Letters Patent is hereby corrected as shown below:

Column 20,
Line 44, "where in" should read -- wherein --
Line 55, "disperses" should read -- dispersed --
Line 60, "bas as said" should read -- has as said --
Line 62, "un said apace:" should read -- with said space --

Signed and Sealed this

Twenty-ninth Day of October, 2002

Attest:

JAMES E. ROGAN
Attesting Officer    Director of the United States Patent and Trademark Office